United States Patent Office 2,943,496
Patented July 5, 1960

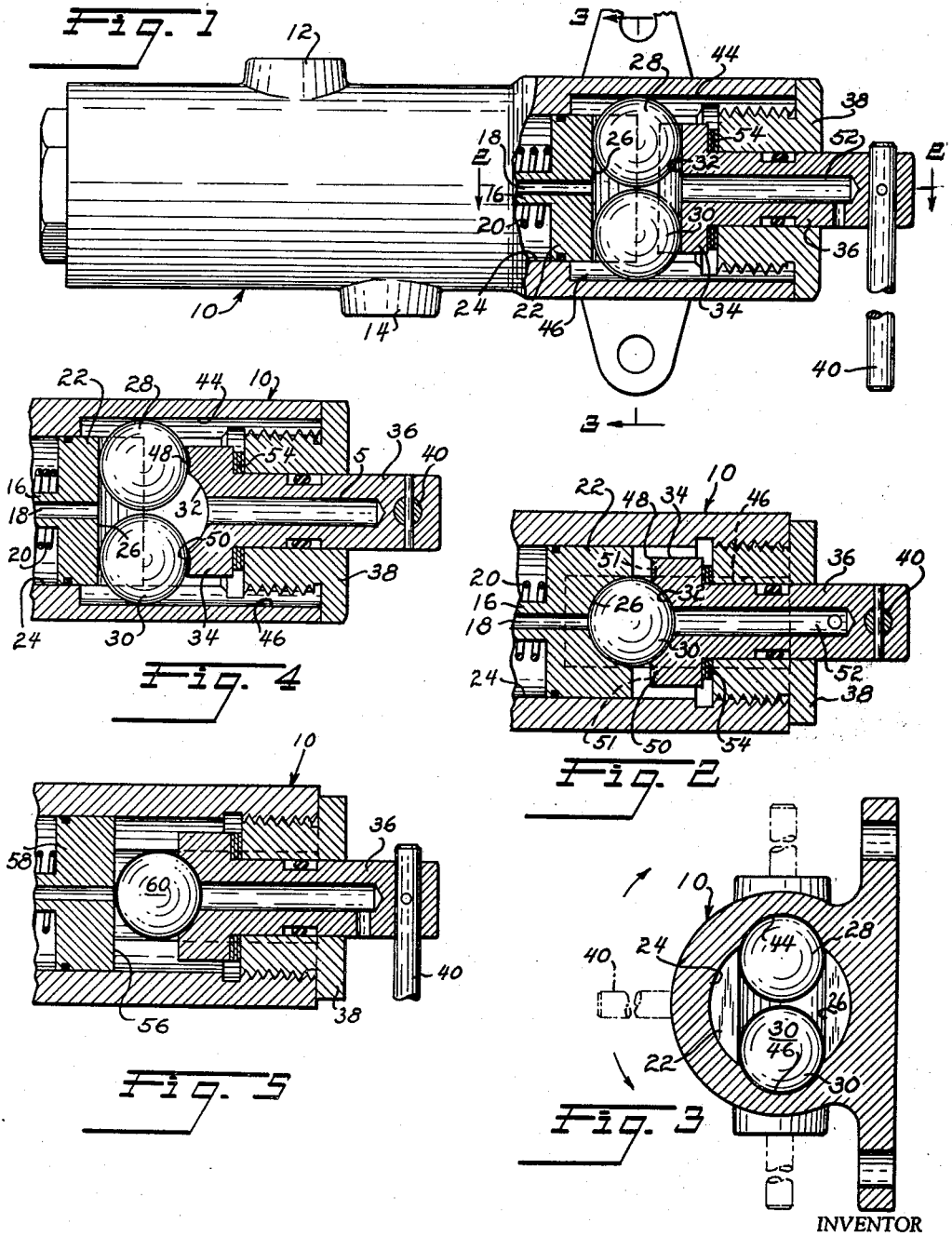

2,943,496
MOTION TRANSLATING DEVICE

Harry M. Valentine, Elyria, Ohio, assignor to Bendix-Westinghouse Automotive Air Brake Company, Elyria, Ohio, a corporation of Delaware Filed Sept. 25, 1958, Ser. No. 763,235

6 Claims. (Cl. 74—56)

This invention relates to actuators and more particularly to improved means for translating rotary motion to linear motion.

The principal object of the present invention is to provide rotary-to-linear motion translating means which is particularly though by no means exclusively, adapted to the opening and closing of linearly movable valves through the rotation of a manually operable handle.

More particularly it is an object of the present invention to provide motion translating means in which the linearly movable member is moved between two positions, for example, between fully open and fully closed positions in the case of a valve, merely by the rotation of a manually movable member through 90° of arc.

More specifically it is an object of the invention to provide motion translating device wherein linear movement is imparted to one member through the action of a plurality of balls which are cammed clear of a groove in a rotatable member to impart linear motion to the first member at least equal to the depth of the groove, the translated motion being effected with no more than a quarter-turn of the rotatable member and without regard to its direction of rotation.

Other objects and their attendant advantages will become apparent when the following detailed description is read in conjunction with the accompanying drawings wherein:

Fig. 1 is a plan view partly in elevation and partly in cross-section showing the motion translating means applied to the actuation of a valve;

Fig. 2 is a cross-sectional view taken substantially on the line 2—2 of Fig. 1;

Fig. 3 is a cross-sectional view taken substantially on the line 3—3 of Fig. 1;

Fig. 4 is a cross-sectional view similar to Fig. 1 but showing parts of the invention in changed position; and Fig. 5 is a view similar to Fig. 1 but showing a second embodiment of the invention.

As the following detailed description proceeds it will be apparent to those skilled in the art that the present invention has utiliity in a variety of situations where it may be desirable to translate rotary to linear motion. For purposes of illustration, however, the invention will be described in its application to valve controls though it should be expressly understood that the present invention is not limited to such use and all other uses are intended to be included within its purview.

Referring now to Fig. 1, a valve body 10 is illustrated containing inlet and outlet ports 12, 14 adapted to be connected into a fluid pressure system (not shown) with passage of fluid between the ports being controlled by a valve (not shown) which may be a simple check valve, spring loaded in the direction of fluid flow and adapted to be unseated against spring pressure through the movement of a manually controlled plunger. Such a plunger is illustrated at 16 in Fig. 1 and this may be provided with an axial passage 18 adapted to vent the port 14 when disconnected from port 12 by closing of the aforementioned check valve, the passage 18 being closed by a seat on the check valve when the plunger has been moved against said valve so as to move it to open position. The described structure is so well known in the art that a further showing or description of the actual valve is not deemed necessary to an understanding of the present invention which is directed to improved means for operating a device such as the plunger 16 mentioned.

The plunger 16 is normally urged in one direction by spring means, which may be the closing spring of the check valve or it may be a second spring such as the spring 20 shown which would be required where the plunger must be lifted clear of the check valve to open an exhaust passage. The plunger is provided at its outer end with an enlarged head portion 22 slidingly received in the bore 24 of the casing 10. The head portion 22 is provided with straight transverse groove 26, arcuate in cross-section, adapted to receive therein a pair of balls 28, 30 whose opposite sides are received in an arcuate groove 32 in an enlarged head 34 rotatable in the outer end of bore 24 and integrally joined with a stem portion 36 which projects through a threaded cap nut 38 to the exterior of the casing 10 where the stem may have attached thereto a suitable handle such as the rod 40 shown. In addition to being received in the grooves 26, 32 of the respective heads 22, 34, the balls, whose combined diameters are greater than the length of either groove, are also received in longitudinal grooves 44, 46 machined into the side of the bore 24 as clearly shown in Fig. 3.

In operation with the parts of the actuator in the position of Fig. 1 when it is desired to move the plunger to the left, the handle 40 is moved in either direction as shown by the arrows in Fig. 3 through 90° causing the groove 32 to be moved relative to groove 26 to cam the balls out of the groove 32 and to the left in Fig. 1. During the camming operation the balls are required to move linearly because of their engagement with the longitudinal grooves 44, 46 which serve as ball guides and positively prevent them from rotating orbitally with head 34 as it is manually turned by the handle 40. The balls 28, 30 ride up the arcuate sides of the groove 32 as this is turned beneath them until the groove axis is at right angles to the line through the ball centers at which point the balls are cammed entirely out of the groove and rest on the surfaces of flats 48, 50 on opposite sides of the groove as clearly shown in Fig. 4. In order to achieve a detent action, the surfaces 48, 50 may be dimpled or provided with shallow grooves shown in dotted lines at 51 in Fig. 2, so as to releasably retain the parts of the actuator in the position of Fig. 4. When the handle is rotated an additional 90° the groove 32 is again moved to the position of Fig. 1 to enable return spring 20 to move the plunger to the right hand position of the drawing as the balls 28, 30 are again received in the groove 32.

In order to permit unimpeded escape of fluid pressure vented through passage 18, the stem 36 of rotatable member 34 is centrally bored to provide a passage 52 connected to atmosphere. If necessary shims 54 may be provided between cap nut 38 and head 34 to regulate the return position of plunger 16.

The embodiment of the invention illustrated in Fig. 5 is substantially identical to that shown in Fig. 1 except that the linearly movable head portion 56 which is integral with the plunger 58 is not provided with a transverse groove, the balls 60 merely bearing against a planar surface on the outer end of head 56 as illustrated. This arrangement is entirely satisfactory where the coefficient of friction between the balls and the planar surface is insufficient to cause the plunger to rotate during any turning movement of the balls about their own axes as they are cammed out of the manually rotated groove. Where there may be a tendency for the plunger to be rotated, it is desirable that the plunger head be grooved as described for Fig. 1.

From the foregoing it will be apparent to those skilled in the art that the present invention provides a novel means for translating rotary motion to linear motion to move a linear member such as an actuator between its two limits of movement with relatively only a slight rotation of the rotatable member not exceeding one-quarter of a turn. Furthermore the invention provides a rotary-to-linear actuator wherein the desired movement of the linearly moving member can be achieved regardless of the duration of rotation of the rotary member. It will be apparent to those skilled in the art that the invention herein shown and described is susceptible of various changes, modifications and uses without, however, departing from the scope and spirit of the appended claims.

What is claimed is:

1. Rotary to linear motion translating mechanism comprising a body member having a hollow interior, a rotatable member in said body member, a linearly movable member spring urged in the direction of said rotatable member, said rotatable and linearly movable members having opposed transverse faces, a pair of diametrically opposed grooves in the internal wall of said body member extending longitudinally in parallel relationship with respect to the axis of rotation of said rotatable member, a groove in the transverse face of said rotatable member, a pair of spherical elements each having a portion received in the groove of the transverse face of said rotatable member, the combined transverse diameters of said elements being greater than the length of said groove in said rotatable member so that said elements extend beyond said groove and into the longitudinal grooves in the internal wall of said body member, said linearly movable member bearing on said spherical elements and being retained by said elements in spaced relationship with respect to the rotatable member, said elements being cammed out of said transverse groove in the face of said rotatable member upon rotation thereof to impart linear movement to said second member at least equal to the depth of said transverse groove.

2. Motion translating mechanism of claim 1 including guide means for preventing rotation of said linear movable member while said balls are being cammed out of said groove by rotation of said rotatable member.

3. A motion translating device comprising a cylindrical housing having a closed end and an open end, a rotatable member extending through said closed end and having an end part in said housing, a transverse groove in said end part normal to the axis of rotation of said rotatable member, a linearly movable member extending through the open end of said housing and having an end part in said housing in opposing relationship with respect to the end part of said rotatable member and resiliently urged in the direction of said rotatable member, a pair of diametrically opposed grooves in the internal wall of said housing extending longitudinally in parallel relationship with respect to the axis of rotation of said rotatable member, a pair of side-by-side balls each having a portion received in the transverse groove of said rotatable member and a portion received in the respective opposed longitudinal grooves of said housing, said balls bearing on the end part of said linearly movable member and retaining said member in spaced relationship with respect to the end part of said rotatable member, and means external to said housing for rotating said rotatable member to cam said balls out of the transverse groove of said rotatable member and against said linearly movable member so as to impart movement thereto in a direction away from said rotatable member.

4. The motion translating device of claim 3 wherein said transverse surface is provided with a groove for receiving a portion of each of said balls.

5. The motion translating device of claim 3 wherein all of said grooves are arcuate in cross-section having radii of curvature corresponding to the radii of said balls.

6. The motion translating device of claim 3 wherein said rotatable member is provided with flats on opposite sides of said groove, said flats being provided with ball receiving recesses to provide detent action for releasably retaining said balls on said flats upon their being cammed from said groove by rotation of rotatable member.

References Cited in the file of this patent

UNITED STATES PATENTS

| 1,367,827 | Noble | Feb. 8, 1921 |
| 2,201,095 | Kaufman | May 4, 1940 |

FOREIGN PATENTS

| 1,081,504 | France | June 9, 1954 |